US012024346B2

(12) United States Patent
Chopin et al.

(10) Patent No.: US 12,024,346 B2
(45) Date of Patent: Jul. 2, 2024

(54) FILTERING FITMENT FOR FLUID PACKAGING

(71) Applicant: Liqui-Box Corporation, Richmond, VA (US)

(72) Inventors: Lamy Chopin, Missouri City, TX (US); James W. Johnson, Delaware, OH (US); Ronald E. Kieras, Woodstock, IL (US); Matthew Ruschmeier, Glencoe, MN (US); Paul N. Georgelos, Naperville, IL (US)

(73) Assignee: Liqui-Box Corporation

( * ) Notice: Subject to any disclaimer, the term of this patent is extended or adjusted under 35 U.S.C. 154(b) by 0 days.

(21) Appl. No.: 18/099,463

(22) Filed: Jan. 20, 2023

(65) Prior Publication Data

US 2023/0227221 A1 Jul. 20, 2023

Related U.S. Application Data (63) Continuation of application No. 17/100,461, filed on Nov. 20, 2020, now Pat. No. 11,639,255.

(60) Provisional application No. 62/937,978, filed on Nov. 20, 2019.

(51) Int. Cl.
   B65D 51/24 (2006.01)
(52) U.S. Cl.
   CPC .................................. B65D 51/24 (2013.01)
(58) Field of Classification Search
   CPC ..... B65D 51/24; C02F 1/688283; C02F 1/001
   USPC .... 222/189.06, 189.07, 189.08, 109.11, 190; 137/550, 554; 229/105, 106; 383/80
   See application file for complete search history.

(56) References Cited

U.S. PATENT DOCUMENTS

| | | | |
|---|---|---|---|
| 1,674,203 | A | 6/1928 | Clifford |
| 4,181,243 | A | 1/1980 | Frahm |
| 4,314,768 | A | 2/1982 | Goglio |
| 4,421,146 | A | 12/1983 | Bond et al. |
| 4,445,551 | A | 5/1984 | Bond et al. |
| 4,764,274 | A | 8/1988 | Miller |
| 4,828,692 | A | 5/1989 | Peranio |

(Continued)

FOREIGN PATENT DOCUMENTS

| | | |
|---|---|---|
| JP | 2015 0123996 A | 7/2015 |
| WO | 01/36276 | 5/2001 |
| WO | 2004085283 | 10/2004 |

OTHER PUBLICATIONS

International Application No. PCT/US2020/061580, Search Report and Written Opinion, dated Feb. 15, 2021, 13 pages.

*Primary Examiner* — J C Jacyna
(74) *Attorney, Agent, or Firm* — MCANDREWS HELD & MALLOY, LTD (57) ABSTRACT

Filtering assemblies to be used with a flowable material container. The assembly includes a filtering screen. The assembly further includes filtering media. The filtering media includes activated carbon. The filtering media includes dissolvable material. The assembly further includes a filtering basket to contain the filtering media. The assembly further includes a valve assembly. The assembly further includes a spout with a filter. The spout further includes a removable filter. The removable filter is configured to extend beyond the end of the spout. The removable filter includes circulation holes. The removable filter is configured to be pushed into the spout by a closure cap. The removable filter is configured to contain filtering media.

20 Claims, 7 Drawing Sheets

(56) References Cited

U.S. PATENT DOCUMENTS

| | | | | |
|---|---|---|---|---|
| 5,031,662 | A | 7/1991 | Roethel | |
| 5,095,962 | A | 3/1992 | Lloyd-Davies et al. | |
| 5,433,345 | A | 7/1995 | Sasaki | |
| 5,680,970 | A | 10/1997 | Smith et al. | |
| 5,697,410 | A | 12/1997 | Rutter et al. | |
| 5,840,185 | A * | 11/1998 | Hughes | B01D 35/04 210/477 |
| 5,901,761 | A | 5/1999 | Rutter et al. | |
| 5,919,365 | A | 7/1999 | Collette | |
| 5,983,964 | A | 11/1999 | Zielinksi et al. | |
| 6,246,230 | B1 | 6/2001 | Ricci | |
| 6,347,785 | B1 | 2/2002 | Copp et al. | |
| 6,779,556 | B2 | 8/2004 | Roethel | |
| 6,984,278 | B2 | 1/2006 | Anderson et al. | |
| 7,757,907 | B2 | 7/2010 | Smith et al. | |
| 8,517,061 | B2 | 8/2013 | Johnson | |
| 8,578,979 | B2 | 11/2013 | Johnson | |
| 11,364,456 | B2 * | 6/2022 | Macoretta | B01D 29/05 |
| 2002/0148857 | A1 | 10/2002 | Savage | |
| 2005/0139565 | A1 | 6/2005 | Cohn | |
| 2007/0053617 | A1 | 3/2007 | Naidu | |
| 2009/0155436 | A1 | 6/2009 | Chalmers | |
| 2010/0028515 | A1 * | 2/2010 | Gormley | B01F 23/23611 426/477 |
| 2012/0017766 | A1 | 1/2012 | Anson | |
| 2012/0061394 | A1 | 3/2012 | Pritchard | |
| 2013/0199989 | A1 | 8/2013 | Kuennen | |
| 2014/0339270 | A1 | 11/2014 | Johnson | |
| 2016/0096718 | A1 * | 4/2016 | Gallardo | B01D 35/02 222/189.06 |
| 2016/0340217 | A1 | 11/2016 | Kuennen | |
| 2017/0055758 | A1 | 3/2017 | Roth | |
| 2018/0008086 | A1 | 1/2018 | Dubief | |
| 2020/0040290 | A1 | 2/2020 | Leverich | |

* cited by examiner

FILTERING FITMENT FOR FLUID PACKAGING

RELATED APPLICATIONS

This application is a continuation of U.S. application Ser. No. 17/100,461, filed Nov. 20, 2020, which is related to, and claims priority to, U.S. Provisional Application No. 62/937,978, filed Nov. 20, 2019, titled "Filtering Fitment for Bag-In-Box Packaging." The complete subject matter and contents of those applications are incorporated herein by reference in their entirety.

BACKGROUND

This disclosure generally relates to devices and methods of preventing unwanted flavors in packaged liquids, and more particularly relates to new designs of dispensing fitments for use with containers having a packaged liquid.

Water packaging has often had issues with off-tastes associated with either the packaging, the water sterilization process, or the combination of the packaging and the sterilization. Ozonation, for instance, imparts an off-taste due to the presence of ozone in the packaged water. If a package provides too much of a barrier, then the ozone may be trapped in the package with the water. Addressing this sometimes requires a holding period prior to filling the package to allow the ozone to dissipate. Ozone can also react with components of the package, such as a slip agent, causing oxidation of the slip agent and resulting in undesired or "rancid" flavors. Other treatment/packaging issues can also result in small molecules that impart unwanted flavors to water. Packaging or the packaging process can also affect other kinds of fluids besides water that are provided in packaging.

SUMMARY

Certain embodiments of the present technology include a fitment for dispensing a flowable material from a container. The fitment includes a body defining a fluid passage that is in fluid communication with an internal region of the container. The fitment includes a screen adjacent to the fluid passage and a filter media, wherein when flowable material is dispensed from the container, the flowable material passes through screen and the filter media.

The screen may include a first screen and a second screen and the filter media is located in between the first and second screens. The first and second screens may be part of a basket that is insertable into the fluid passage. The basket may include a top and a body connected by a hinge, such that the top of the basket can be moved to an open position and to a closed position.

The fitment may include a valve assembly downstream of the fluid passage, wherein the valve assembly includes a valve outlet and a screen proximate the outlet that retains filter media proximate the outlet. The valve assembly may be configured to operate in an open position that allows the flowable material to move through the fitment and out the outlet, and a closed position which prevents flowable material from flowing out of the outlet.

The screen may include holes or slots. The screen may be concave. The screen may be detachably secured to the body.

The fitment may be configured to be inserted into a spout connected to the container.

The filter media may include activated carbon. The filter media may be dissolvable. The flowable material may be configured to dissolve the filter media while the flowable material is dispensed through the fitment. The filter media may react with the flowable material to form carbon dioxide. The filter media may be configured to interact with the flowable material of the container while the flowable material is not being dispensed through the fitment.

The screen may be removable from the fitment. The fitment may be insertable into a spout and extend below a bottom of the spout into the container and the fitment may include circulation holes or slots in the portion of the fitment that extends below the bottom of the spout.

Certain embodiments of the present technology include a fitment for dispensing a flowable material from a container. The fitment includes a body defining a fluid passage that leads to a dispensing valve, the fluid passage being in fluid communication with an internal region of the container. The fitment includes a screen and a filter media. When flowable material is dispensed from the container, the flowable material passes through screen and the filter media.

The screen may include a first screen and a second screen and the filter media may be located in between the first and second screens. The first and second screens may be part of a basket that is insertable into the fluid passage. The may be located proximate an outlet of the dispensing valve, and the screen may retain the filter media proximate the outlet such that the filter media is isolated from the flowable material when the valve assembly is in a closed position. The fitment may be configured to be inserted into a spout connected to the container.

DETAILED DESCRIPTION

This disclosure is directed to methods, systems, and apparati for removing unwanted tastes or impurities from drinking water, or other flowable media, that is packaged in a container, for example in bag-in-box packaging. This disclosure is also directed to isolating a solid from liquid contents until dispensing occurs.

As used herein, the terms "first," "second," "third," etc., are used to enumerate instances of similar or identical elements, and do not indicate or imply order unless an order is specifically identified.

As used herein, the term "inner surface" refers to the portion of a given component closest to the fluid flow path and the term "outer surface" refers to the portion of a given component away from the fluid flow path.

As used herein, the term "inward" refers to the direction towards the fluid container and the term "outward" refers to the direction away from the fluid container.

Figure 1:
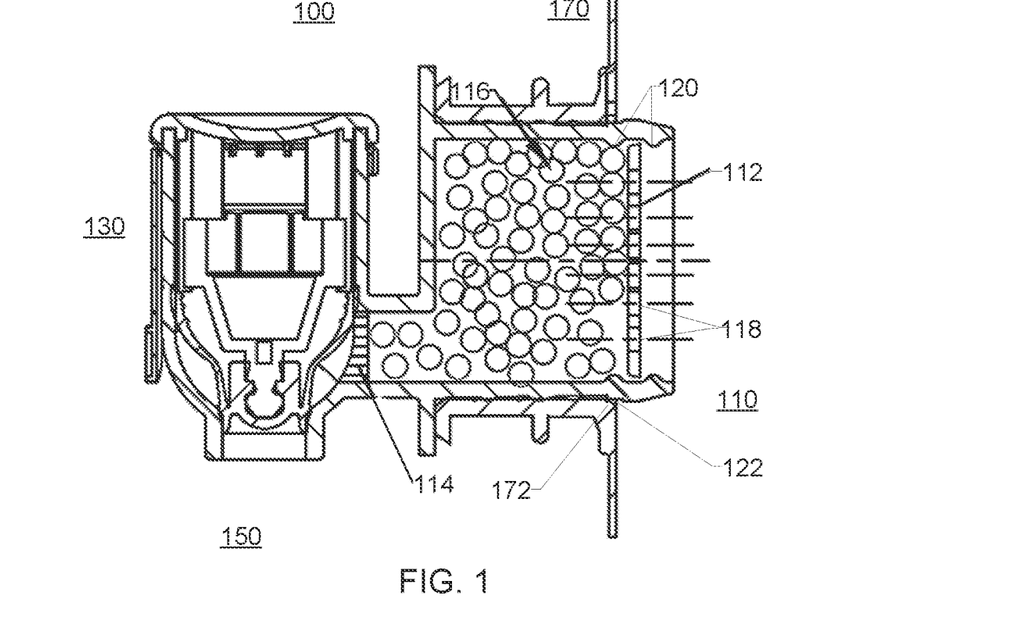
FIG. 1 is a cross section side view of an example fitment assembly with a molded screen, a lock-in filter screen, and the associated filter material attached to the spout of fluid container, in accordance with aspects of this disclosure.

Turning now to the drawings, FIG. 1 is a cross section view of a first embodiment of a fitment 100 installed in the spout 170 of a container. The container is configured to store a dispensable liquid or flowable solid such as water. In some examples, the container may be a bag-in-box type container system including a film bag to contain the liquid and cardboard box to enclose the film bag. In other examples, the container may be a rigid or semi-rigid plastic container. In other examples, the container may be aluminum or another type of metal or metal alloy. In some examples, container is filled with the flowable material into the bag through the spout 170 and then the spout is closed with the fitment 100.

In the first embodiment, the fitment 100 defines a body having a fluid passageway. The fitment includes an inlet 110, a valve assembly 130, and an outlet 150. The valve assembly 130 may have an open position that allows fluid to flow from the inlet 110, through the valve assembly 130, and through the outlet 150. The valve assembly 130 may have a closed position that prevents fluid from flowing from the inlet 110, through the valve assembly 130, and through the outlet 150. In some examples, a user may place the valve assembly 130 in the open position from the closed position by rotating a valve cap, pushing an elastomeric button, pulling a slide, or similar method for operating a valve known in the field of dispensing fluid from a container.

The fitment inlet 110 may include a removable screen 112 and a valve screen 114. The removable screen 112 and the valve screen 114 may retain a filter media 116 within the fitment inlet 110. In some examples, the filter media 116 may include activated carbon, for example, activated charcoal. The filter media 116 may be configured to adsorb small molecules or other impurities that may affect the taste and/or quality of the stored flowable material. The adsorption of impurities may occur based on contact with flowable material prior to dispensing and/or during dispensing of the flowable material through the fitment. Additionally, some impurities may be adsorbed during temporary storage of the fitment within the container prior to the filling of the flowable material into the container. The filter media 116 may be dissolvable. For example, flowable material is configured to dissolve the filter media while the flowable material is dispensed through the fitment 100.

The filter media 116 may be formed by molding or extrusion into pellets that are easily retained by the removable screen 112 and/or valve screen 114 in the fitment inlet 110. As shown in the first embodiment, the filter media 116 may have a spherical shape. In other embodiments, the filter media 116 may be cylindrical, conical, cubical, or other three-dimensional shape. In other embodiments, the filter media 116 have one or more fluid passages through the media such as having a toroidal or honeycomb shape. The size and shape of the filter media 116 may be selected based on factors such as the wetted surface area, the desired flow rate of the flowable material through the fitment inlet, the size of the fitment inlet, and the expected level of impurities within the sealed container. As shown in the calculation below, it is believed that activated charcoal in a volume of one cubic centimeter should be sufficient to adsorb the impurities resulting from the forming of a 2.5 gallon bag-in-box style container.

Preliminary Calculations on Activated Carbon:
Activated carbon adsorption ability: 20-25 g organic per 100 g of carbon (rule-of-thumb, source: emis.vito.be)
Bulk density of granulated carbon: 250-650 kg/m^3 or 1 cc=0.25-0.65 g
Thus, 1 cc of granulated carbon may adsorb about 0.05 g of organics.
A 2.5 gallon inner ply container uses approximately 20 g of film. At 700 ppm erucamide in the film, approximately 0.014 g total of additive may be present in the container. Thus, 1 cc of granulated carbon should sufficiently adsorb the resulting additives of the film container.
Furthermore, activated charcoal is known in the art to facilitate catalytic redox reactions of contaminants, further extending its ability to eliminate off-tastes even beyond its ability to adsorb contaminants.

In the first embodiment, the valve screen 114 may be molded into the fitment 100 between the valve assembly 130 and the fitment inlet 110. The valve screen 114 may have one or more holes to allow the fluid to flow from the fitment inlet 110, through the valve screen 114, and to the valve assembly 130 while preventing the filter media 116 from entering the valve assembly 130. Similarly, the removable screen 112 may have one or more holes 118 to allow fluid to flow from the container and through the removable screen 112 while preventing the filter media 116 from exiting the fitment inlet 110. In the first embodiment, the removable screen 112 may be held in position within the fitment inlet 110 with retention bumps 120. In other embodiments, the removable screen 112 may fit within a groove of the fitment inlet 110 or may have either internal or external threads to attach to the fitment inlet 110. In other embodiments, the removable screen 112 may rely on an interference fit or may be sonically welded or affixed to the fitment inlet 110 by some other similar method. In some examples, the fitment 100 may be assembled by inserting an amount of the filter media 116 into the filter inlet 110 then installing the removable screen 112 to retain the filter media 116.

In other embodiments, a second removable screen 112 may be used instead of the molded valve screen 114 of the first embodiment to prevent the filter media 116 from entering the valve assembly 130. The second removable screen may be similar or identical to the first removable screen 112. In yet other embodiments, a valve screen 114 may be omitted based on the size and/or shape of the filter media 116 preventing the filter media 116 from entering the valve assembly 130.

In the first embodiment, the fitment inlet 110 is inserted into the spout 170 of the container. The fitment inlet 110 may have a locking ledge 122. The spout 170 may have a corresponding locking shelf 172 configured to abut against the locking ledge 122 when the fitment inlet 110 is fully inserted within the spout 170 thus preventing the subsequent removal of the fitment 100 once the container has been filled. In other embodiments, the fitment inlet 110 may have external threads to mate with the internal threads of a corresponding spout 170 to secure the fitment inlet to the spout. In yet other embodiments, internal threads of the fitment inlet 110 may mate with external threads of a corresponding spout 170 to secure the fitment inlet 110 to the spout 170.

Figure 2A:
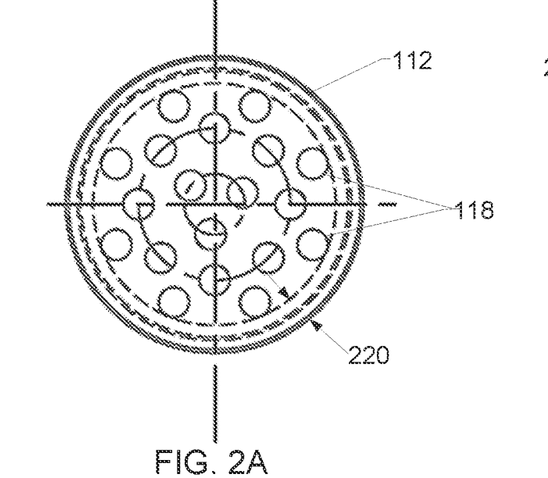
FIG. 2A is an example of a filter screen to be used with the example fitment of FIG. 1.

FIG. 2A is a front view of the removable screen 112 of FIG. 1. The removable screen 112 of FIG. 2 has a plurality of holes 118 sized and spaced to allow the flowable material to pass through from the container into the fitment 100. The holes 118 are also sized to prevent the filter media 116 from exiting the fitment inlet 110. The filter screen 112 of FIG. 2A may be molded from plastic. In other embodiments, the filter screen 112 could be a stamped metal part. As seen in FIG. 1, the filter screen 112 may have a constant thickness. In other embodiments, the filter screen could have a thicker outer edge 220 to provide additional rigidity in the mating surface between the filter screen 112 and the spout inlet 110.

Figure 2B:
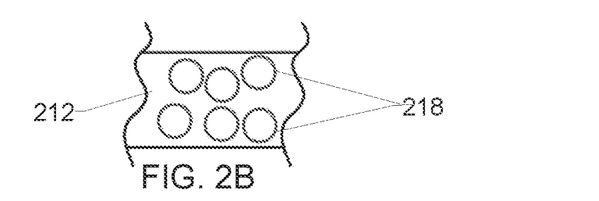
FIG. 2B is an example of a filter screen to be used with the example fitment of FIG. 1.
Figure 2C:
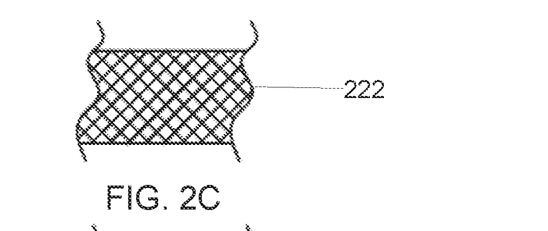
FIG. 2C is an example of a filter screen to be used with the example fitment of FIG. 1.
Figure 2D:
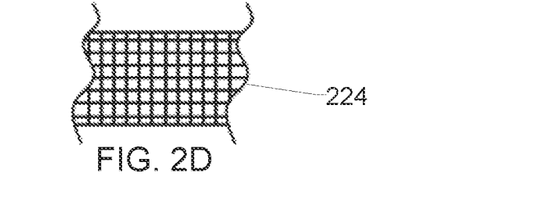
FIG. 2D is an example of a filter screen to be used with the example fitment of FIG. 1.

FIGS. 2B, 2C, and 2D are additional example embodiments of alternative filter screen patterns which may be used with either the removable screen 112 or the molded valve screen 114 of FIG. 1. In contrast with the concentric holes 118 of FIG. 2A, the holes 218 of FIG. 2B may be spaced at other intervals. In some embodiments, the location of the holes 218 and the orientation of the filter 212 may be selected to adjust the flow path of the flowable material through the filter media 116. FIGS. 2C and 2D show a first mesh pattern 222 and a second mesh pattern 224 that may be used as part of a filter screen 112 or 114. In some embodiments, the mesh patterns 222 and 224 may be molded as part of the removable filter screen 112 or 114. In some embodiments, the mesh patterns 222 and 224 may have a thinner thickness than the outer edge 220 (FIG. 2A). In some embodiments, the mesh patterns 222 and 224 may be made of a first material such as nylon thread or wire and the outer edge 220 may be molded around the first material. In other embodiments, the outer edge may be separately formed then subsequently attached to the first material of one of the mesh patterns 222 or 224.

Figure 3:
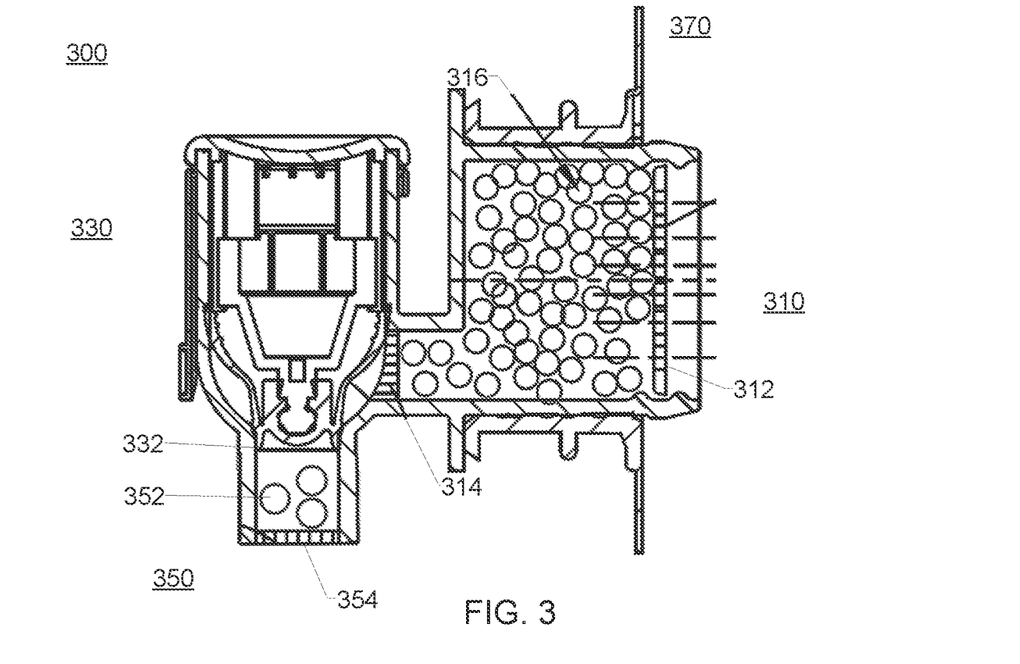
FIG. 3 is across section side view of a second embodiment of an example fitment assembly with filter material on the discharge side of the isolating valve.

FIG. 3 is a cross section side view of a second embodiment of the fitment 300 and associated spout 370 of the present technology. Similar to the first embodiment of FIG. 1, the fitment 300 of the second embodiment may include an inlet 310, a valve assembly 330, and an outlet 350. The fitment 300 may include a removable screen 312, a valve screen 314, and an inlet filter media 316 or any of the other alternate configurations described with in regards to the first embodiment that would place the filter media 316 in fluid communication with the flowable material during storage. In other examples, the inlet filter media 316 and the corresponding removable screen 312 and valve screen 314 may be omitted.

In contrast with the fitment 100 of FIG. 1, the fitment 300 of FIG. 3 may include an outlet filter media 352. In some embodiments, the outlet filter media 352 may be the same type of material used in the inlet filter media 316 such as activated charcoal. In other embodiments, the outlet filter media 352 may include one or more of flavoring, nutrients, or other additives that may or may not be stable in water or the associated stored flowable material stored in the container. The additives may coat portions of an inert filter media 352 retained in place by the outlet screen 354. The additives can react with and/or be incorporated into the dispensed flowable material. As a result of the outlet filter media 352 being on the discharge side of the valve assembly 330, the outlet filter media 352 is not exposed to the stored flowable material of the container until the valve assembly 330 is placed into the open condition allowing the flowable media to flow through the fitment inlet 310, through the valve assembly 330, and through the fitment outlet 350. Alternatively and/or additionally, the additives of the outlet filter media 352 may benefit from the valve assembly 330 separating the inlet filter media 316 from the outlet filter media 352 thus preventing the inlet filter media 316 from adsorbing the outlet filter media 352 additives during storage of the flowable material. Other contents besides beverages and food may also benefit from this concept. For instance, a reactive material could be isolated from a reactant flowable material within the container until dispensing occurs.

The outlet filter media 352 may be retained by a molded outlet screen 354 similar to the molded valve screen 114 of FIG. 1. In these embodiments, the outlet filter media 352 may be placed within the fitment outlet 350 prior to the installation of the sub-components of the valve assembly 330. In other embodiments, a removable outlet screen 354 similar to the removable screen 112 of FIG. 1 could be used. The removable outlet screen 354 could be retained by the fitment outlet 350 using any of the methods described above associated with removable screen 112 of the first embodiment. The outlet filter media 352 thus could be added after the valve assembly 330 is installed.

In these configurations, the fitment outlet 350 may rely on the valve sealing surfaces 332, the size and shape of the outlet filter media 352, and the flow of the flowable material during use to prevent the outlet filter media 352 from entering the valve assembly 330. In other embodiments, the fitment outlet may use one or more screens on either side of the outlet filter media 352 that may be molded as part of the fitment 300 and/or removable. In some embodiments, the fitment outlet 350 may be stored prior to the first use and/or between uses with a cap or film covering the end of the fitment outlet 350 to prevent moisture and/or other air constituents from reacting with the outlet filter media 352.

Figure 4:
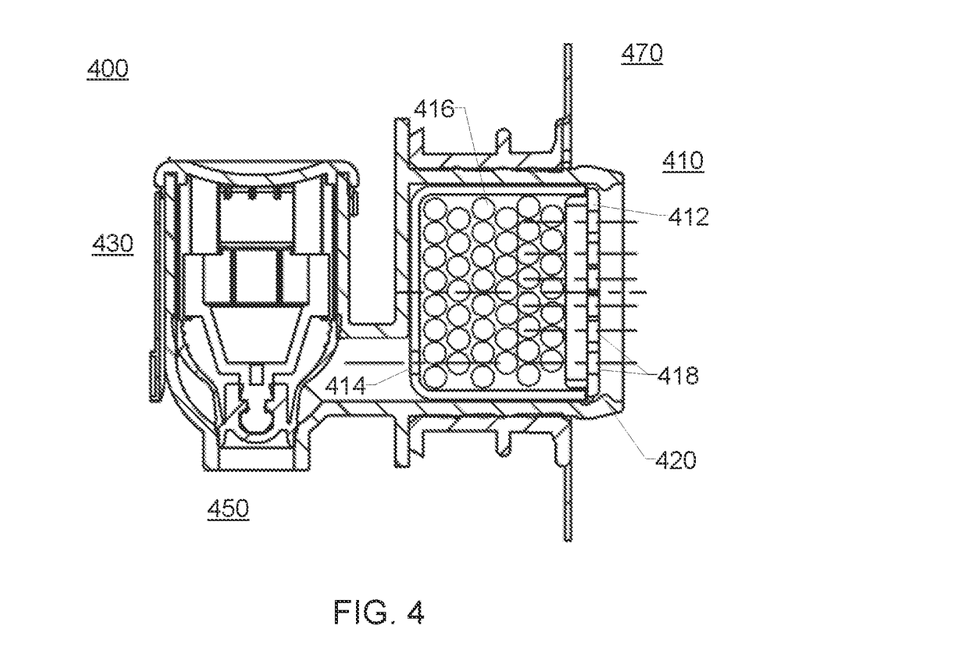
FIG. 4 is a cross section side view of a third embodiment of an example fitment assembly with a separate filter basket to contain the filter material.

FIG. 4 is a cross section side view of a third embodiment of the fitment 400 and associated spout 470 of the instant present technology. The fitment 400 may include an inlet 410, valve assembly 430, and an outlet 450. Instead of the separate removable screen 112, valve screen 114 and sidewalls of the inlet 110 containing the filter media 116 of the first embodiment, the third embodiment may use a filter basket 412 to contain the filter media 416. This allows the filter media 416 to be loaded into the filter basket 412 at one point in time and allow the filter basket 412 to be installed into the fitment inlet 410 at another time such as just before the fitment 400 is installed within the spout 470. Separately assembling the filter basket 412 may help minimize filter media 116 ending up in less desired locations and/or may provide greater flexibility in storage methods.

Similar to the removable screen 112 of the first embodiment, the filter basket 412 may have one or more holes 418 on a first side to allow the flowable material from the container to flow into the filter media 416. The first side holes 418 prevent the filter media 416 from escaping the filter basket 412. Similarly, the filter basket 418 may have one or more holes 414 on a second side that allow the flowable media to flow from the container, through the fitment inlet 410, through the valve assembly 430, and out the fitment outlet 450 when the valve assembly 430 is in the open condition. However, the second side holes 414 retain the filter media 416 and prevent the filter media 416 from reaching the valve assembly 430.

The fitment inlet 410 may have a retention bump 420 to help retain the filter basket 412 after the filter basket 412 is inserted within the inlet 410. In other embodiments, the fitment basket 412 may have an interference fit with the fitment inlet 410, eliminating the need for a separate retention bump 420.

One would recognize a similar filter basket 412 could be used in a fitment outlet similar to the fitment outlet 350 of the fitment assembly 300 of the second embodiment shown in FIG. 3 instead of the outlet screen 354 described with that embodiment. A filter basket may be particularly useful for automated assembly of the fitment system. A filter basket may also allow for atmospheric isolation of the fitment basket and filter media prior to assembly, in order to preserve a sensitive filter medium.

Figure 5A:
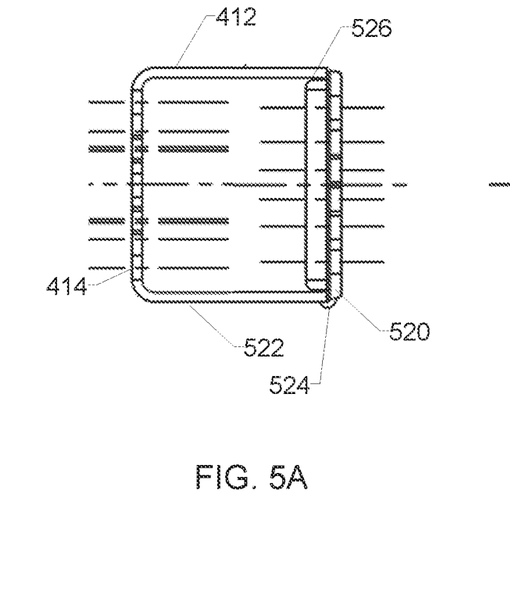
FIG. 5A is a cross section view of the filter basket of the fitment assembly of FIG. 3 in the closed position.
Figure 5B:
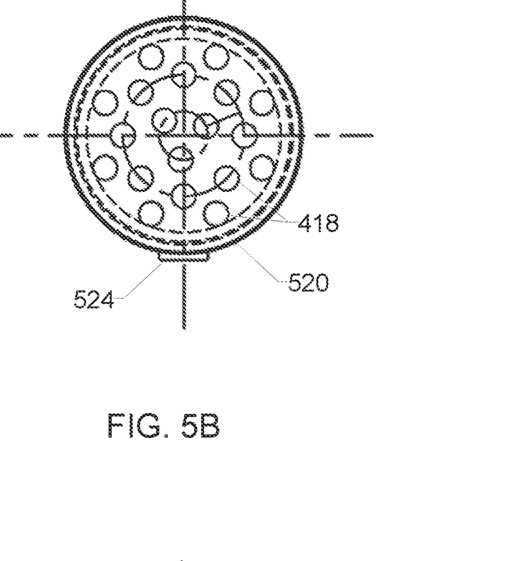
FIG. 5B is an end view of the filter basket of the fitment assembly of FIG. 3 in the closed position.
Figure 6A:
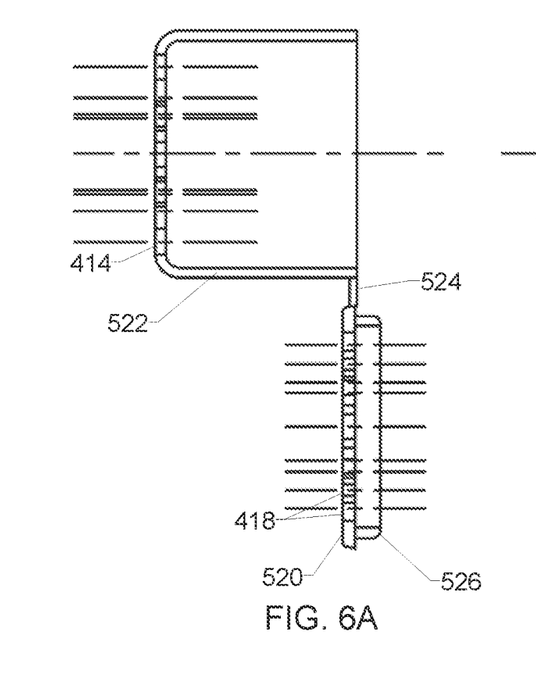
FIG. 6A is a cross section side view of the filter basket of the fitment assembly of FIG. 3 in the opened position.
Figure 6B:
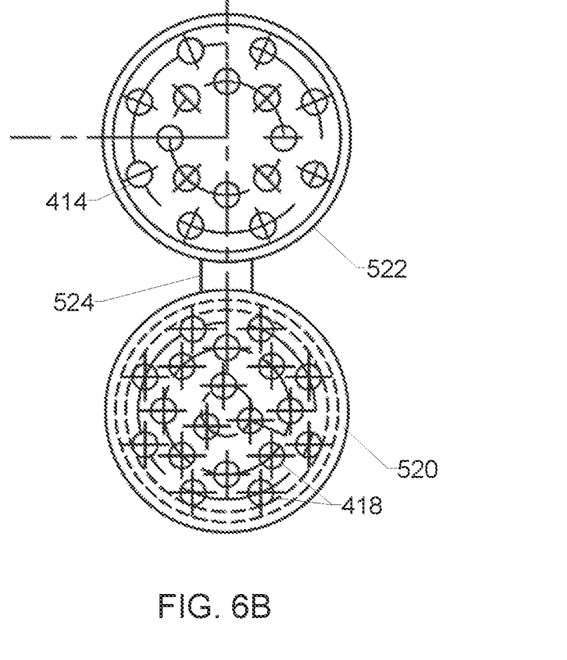
FIG. 6B is an end view of the filter basket of the fitment assembly of FIG. 3 in the opened position.

FIGS. 5A, 5B, 6A, and 6B show the filter basket 412 of the third embodiment of FIG. 4. FIG. 5A shows a cross section view of the filter basket 412 in the closed position. FIG. 5B shows a top view of the filter basket 412 in the closed position. FIG. 6A shows a cross section view of the filter basket 412 in the opened position. FIG. 6B shows a top view of the filter basket 412 in the opened position.

The filter basket 412 may further include a basket top 520 and a basket body 522. The first side holes 418 may be in the basket top and the second side holes 414 may be in the basket body 522. The basket top 520 may be attached to the basket body 522 by a flexible basket strap 524 that can serve as a hinge. The basket top 520, basket body 522, and basket strap 524 may be molded as a single unit. In the present embodiment, the basket top 520 may have a greater number of first side holes 418 than the second side holes 414 of the basket body 522. In other embodiments, the first side holes 418 may be identical to the second side holes 414, thus allowing the filter basket 412 to be installed into the fitment inlet 410 with either the basket top 520 or the basket body 522 closer to the valve assembly 430. The basket top 520 may include a retention ledge 526. The retention ledge 526 may engage, such as by a press fit, the upper portion of the basket body 522 to keep the filter basket 412 in the closed position.

Figure 7:
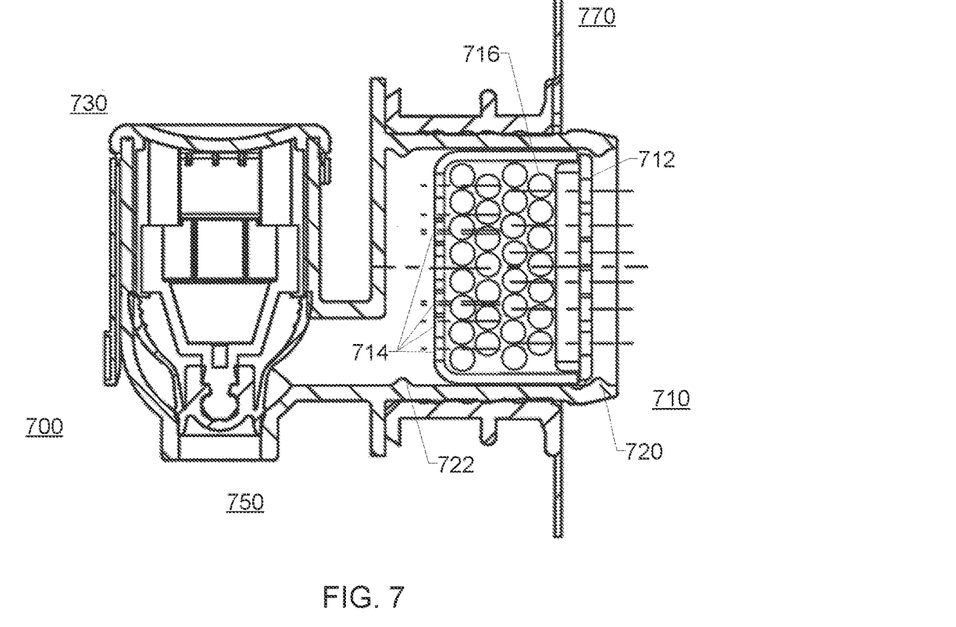
FIG. 7 is a cross section side view of a fourth embodiment of an example fitment assembly with an alternate filter basket to contain the filter material without fully inserting into the fitment inlet.

FIG. 7 is a cross section side view of a fourth embodiment of the fitment 700 and associated spout 770 of the present technology. The fitment 700 may include an inlet 710, valve assembly 730, and an outlet 750. Similar to the fitment 400 of the third embodiment in FIG. 4, the fitment 700 may include a filter basket 712; however, the filter basket 712 may not extend fully into the fitment inlet 710. By offsetting the end of the filter basket 712 from the back surface of the fitment inlet 710, the flowable material may pass through more of the second side holes 714, thus increasing the flow rate through the filter basket 712. In addition to the retention bump 720 of the fitment inlet 710, an offset bump 722 may set the innermost distance the filter basket 712 may be inserted within the filter inlet 710. Similarly, an offset post (not shown) could be added to the same surface as the second side holes 714 to establish the offset distance.

The shortened filter basket 712 of FIG. 7 could also be used to decrease the amount of filter media 716 used. Conversely, in other embodiments a longer filter basket could be used that would extend beyond the back end of the fitment inlet 710. Additional holes around the filter basket body could be added to increase the interaction between the flowable material and the filter media 716 in the storage state, thus, increasing the rate of adsorption of any impurities.

Figure 8A:
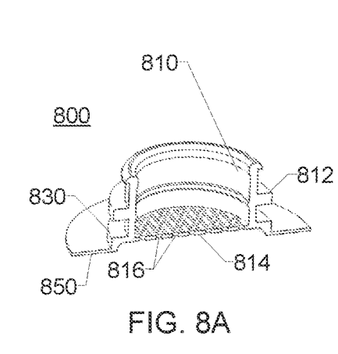
FIG. 8A is a cross-sectional isometric view of an alternative spout with an integrated filter using holes to filter the flowable material going through the spout.
Figure 8B:
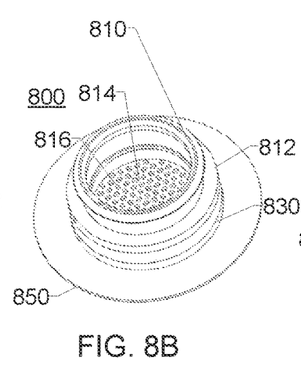
FIG. 8B is a top isometric view of an alternative spout with an integrated filter using holes to filter the flowable material going through the spout.
Figure 8C:
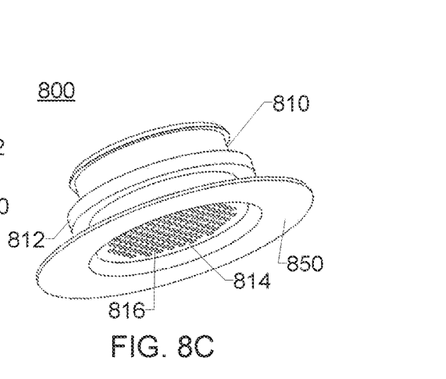
FIG. 8C is a side isometric view of an alternative spout with an integrated filter using holes to filter the flowable material going through the spout.

FIGS. 8A-8C show an alternate spout 800 to be used with a container such as a film bag of a bag-in-box assembly. FIG. 8A is a cross section view of the alternate spout 800. FIG. 8B is an isometric view from an upper angle of the alternate spout 800. FIG. 8C is an isometric view from a lower angle of the alternate spout 800. The spout 800 may include a spout wall 810 and a bag attachment flange 850. A transition ledge 830 may offset the attachment flange 850 from the end of the spout wall 810. A retention flange 812 may extend from the spout wall 810. The retention flange 812 may support the spout 800 against the box (not shown) of the bag-in-box assembly.

A filter surface 814 may span across the opening created by an interior surface of the spout wall 810. The filter surface 814 of this embodiment has a plurality of holes 816. The filter surface 814 may be used to filter particulate larger than the holes 816 during the filling of the container. Alternatively, the filter surface 814 may be used to prevent particulate from exiting the container and entering the spout 800 while dispensing the flowable material from the container. In some embodiments, a filter media similar to that of FIG. 1 could be added directly to the container prior to attaching the spout 800 to the container, thus allowing the filter media to disperse through the container and/or the flowable material after filling the container. The filter media would thus be able to adsorb impurities during the storage of the container. The filter surface 814 would retain the filter media within the container while the flowable material was being dispensed.

One would recognize the filter surface 814 could be used with other similar spouts such as the spout 170 of the first embodiment of FIG. 1 with minor modifications such as shortening the length of the fitment inlet 110. Similarly, in other embodiments, the filter surface 814 could be used with spouts with internal or external threads configured to mate with fitments with corresponding threads. The filter surface 814 could be on spouts configured to mate with fitments with valve assemblies similar to the valve assembly 130 of FIG. 1 and/or fitments configured to attach to the hose of dispensing system such as a milk dispenser.

Figure 9A:
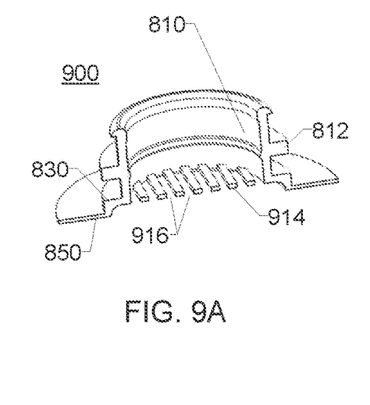
FIG. 9A is a cross-sectional isometric view of a second alternative spout with flat bars and slots to filter flowable material going through the spout.
Figure 9B:
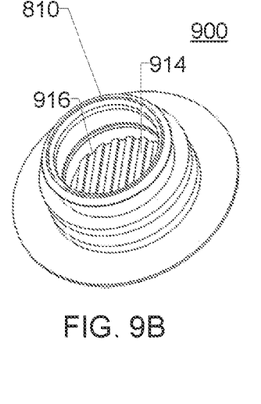
FIG. 9B is a top isometric view of the spout of FIG. 9A.
Figure 9C:
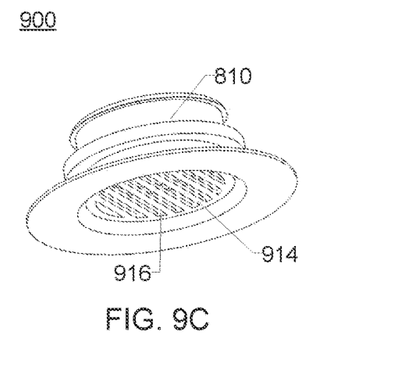
FIG. 9C is a side isometric view of the spout of FIG. 9A.

FIGS. 9A-9C show a second alternate filter design with bars 914 and slots 916 that could be used with spouts such as the spout of FIGS. 8A-8C. FIG. 9A is a cross section view of the alternate filter design with bars 914 and slots 916. FIG. 9B is an isometric view from an upper angle of FIG. 9A. FIG. 9C is an isometric view from a lower angle of FIG. 9A. Instead of the plurality of holes 816 of FIGS. 8A-8C, the slots 916 allow the flowable material to pass through the spout 900. For uniformly shaped material being filtered, such as the filter media 116 of FIG. 1, the bars 914 and slots 916 may provide similar ability to retain the filtered material while allowing greater flow through the spout as compared to the plurality of holes 816 of FIGS. 8A-8C. Conversely, thin and/or long material which may be retained by the holes 816 of FIGS. 8A-8C may in some instances be able to pass through the slots 916 of FIGS. 9A-9C. Although the bars 914 appear to be the same width as the slots 916 of FIGS. 9A-9C, in some embodiments the bars 914 could be narrower than the slots 916. In other embodiments, the bars 914 could be wider than the slots 916.

Figure 10A:
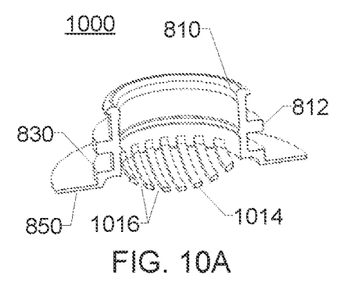
FIG. 10A is a cross-sectional isometric view of a third alternative spout with concave bars and slots to filter flowable material going through the spout.
Figure 10B:
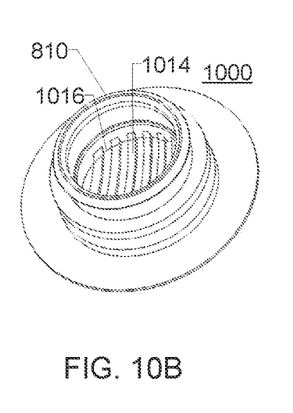
FIG. 10B is a top isometric view of the spout of FIG. 10A.
Figure 10C:
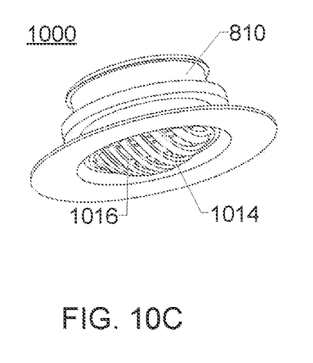
FIG. 10C is a side isometric view of the spout of FIG. 10A.

FIGS. 10A-10C show a third alternate filter design with concave bars 1014 and slots 1016 that could be used with spouts such as the spout of FIGS. 8A-8C. FIG. 10A is a cross section view of the alternate filter design. FIG. 10B is an isometric view from an upper angle of FIG. 10A. FIG. 10C is an isometric view from a lower angle of FIG. 10A. The concave shape of the bars 1014 may aid in concentrating any captured material in the center of the spout 1000 for material flowing into the container. Conversely, for fluid flowing out of the container, the curved shape of the bars 1014 may help shed the filtered material away from the center of the spout 1000, aiding in maintaining flow through the spout while still filtering the material.

Figure 11A:
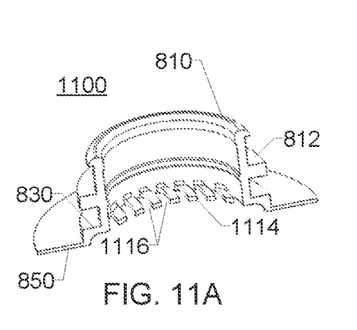
FIG. 11A is a cross-sectional isometric view of a fourth alternative spout with convex bars and slots to filter flowable material going through the spout.
Figure 11B:
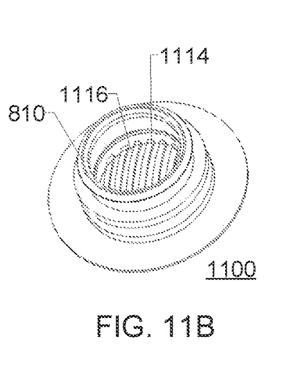
FIG. 11B is a top isometric view of the spout of FIG. 11A.
Figure 11C:
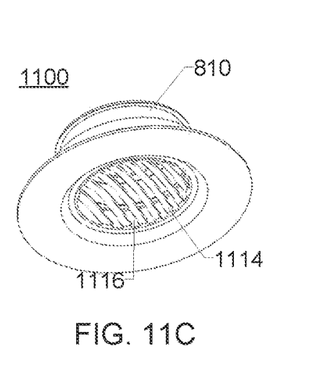
FIG. 11C is a bottom isometric view of the spout of FIG. 11A.

FIGS. 11A-11C show a third alternate filter design with convex bars 1114 and slots 1116 that could be used with spouts such as the spout of FIGS. 8A-8C. FIG. 11A is a cross section view of the alternate filter design. FIG. 11B is an isometric view from an upper angle of FIG. 11A. FIG. 11C is an isometric view from a lower angle of FIG. 11A. The concave shape of the bars 1114 may aid in concentrating any captured material in the center of the spout 1100 for material flowing out of the container. Conversely, for fluid flowing into the container, the curved shape of the bars 1114 may help shed the filtered material away from the center of the spout 1100, aiding in maintaining flow through the spout while still filtering the material.

Figure 12A:
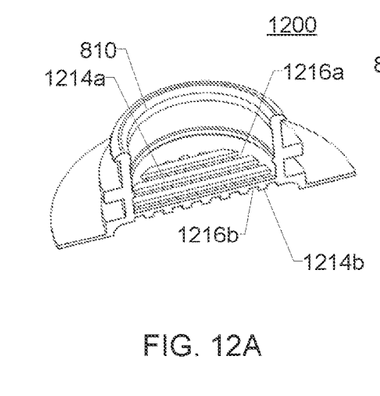
FIG. 12A is a cross-sectional isometric view of a fifth alternative spout with a first set of bars aligned in a first direction and a second set of bars aligned in a second direction to filter flowable material going through the spout.
Figure 12B:
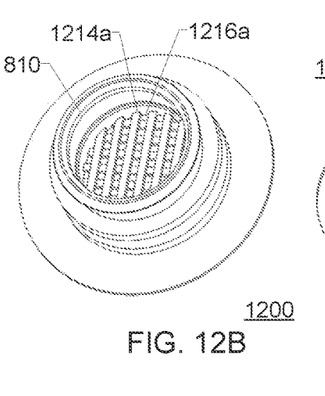
FIG. 12B is a top isometric view of the spout of FIG. 12A.
Figure 12C:
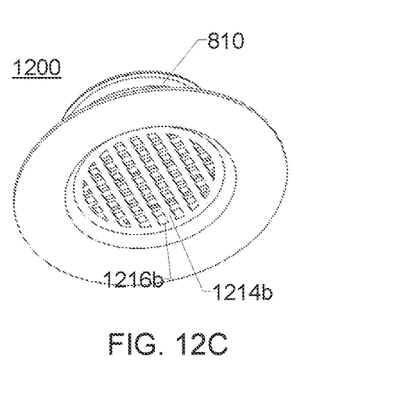
FIG. 12C is a bottom isometric view of the spout of FIG. 12A.

FIGS. 12A-12C show a fourth alternate filter design with a first set of bars 1214*a* aligned in a first direction and a second set of bars 1214*b* aligned in a second direction and corresponding slots 1216*a* and 1216*b* that could be used with spouts such as the spout of FIGS. 8A-8C. FIG. 12A is a cross section view of the alternate filter design. FIG. 12B is an isometric view from an upper angle of FIG. 12A. FIG. 12C is an isometric view from a lower angle of FIG. 12A. The crossing pattern of the bars 1214*a* and 1214*b* create a plurality of holes similar to the holes 816 of FIGS. 8A-8C. However, the crossing pattern may further increase the turbulence of the flowing material as the material passes through the bars 1214*a* and 1214*b*, thus resulting in greater mixing of the material as it is dispensed out the spout 1200.

One would recognize the alternate filter designs of FIGS. 9-12 could similarly be incorporated into and/or used with the removable screen 112 and valve screen 114 of FIG. 1 as well as the filter basket 412 of such as in FIG. 4.

Figure 13A:
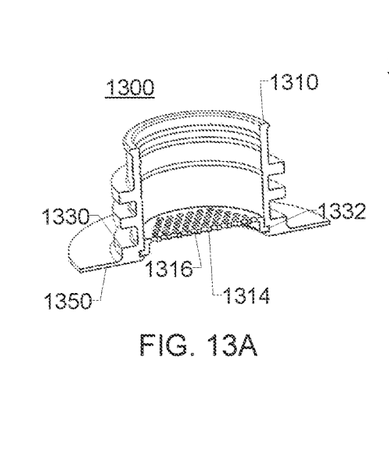
FIG. 13A is a cross-sectional isometric view of a sixth alternative spout with a removable filter with a plurality of holes.
Figures 13B, 13C:
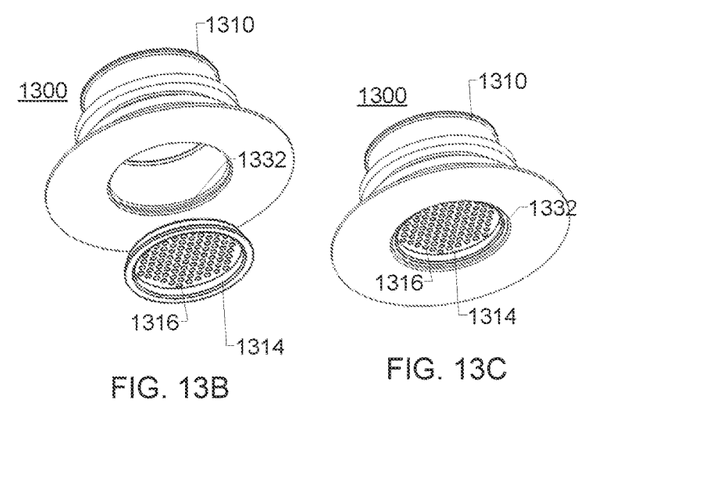
FIG. 13B is an exploded bottom isometric view of the spout of FIG. 13A.
FIG. 13C is a bottom isometric view of the spout of FIG. 13A.

FIGS. 13A-13C show an alternate spout 1300 using a removable filter 1314 that includes holes 1316. The removable filter 1314 is configured to be inserted within a groove 1332 within the transition ledge 1330 of the spout 1300. FIG. 13A is a cross section view of the alternate filter design. FIG. 13B is an exploded, isometric view from a lower angle of FIG. 10A with the removable filter 1314 not yet installed. FIG. 10C an isometric view from a lower angle of FIG. 10A after the removable filter 1314 has been installed. In some embodiments, the retention groove 1332 may be elsewhere along the spout wall 1310. In other embodiments, the removable filter may sit within the spout wall 1310 without a groove. In some embodiments, the removable filter 1332 may be made of the same material as the spout 1300. In other embodiments, the removable filter 1314 may be made of an activated carbon material such as activated charcoal. By using an activated charcoal, the removable filter 1314 would be able to adsorb impurities similar to the filter media 116 of the first embodiment. In some embodiments, the removable filter 1314 may be made of a material configured to react with the liquid being dispensed. In some embodiments, the reaction with the dispensed material may result in the formation of carbon dioxide. One would recognize the alternative filter configurations of FIGS. 9-12 could also be used with the removable filter 1314.

Figure 14A:
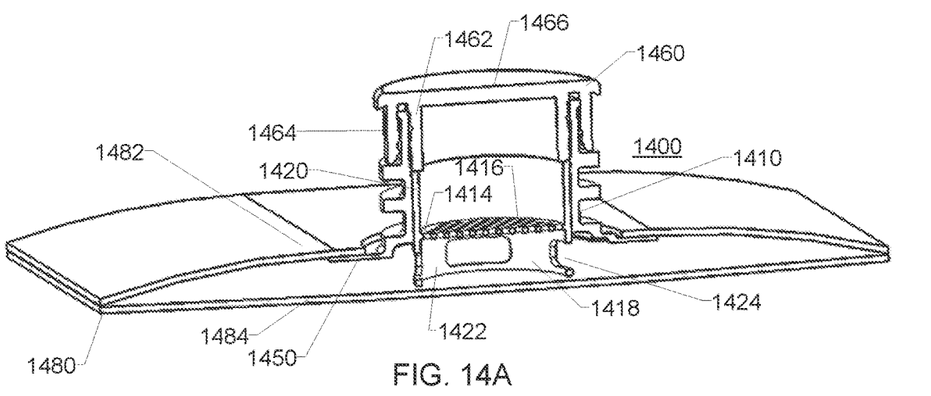
FIG. 14A is a cross-sectional isometric side view of an alternative removable filter with a plurality of holes and with an upper wall portion and a lower wall portion configured to be pushed into the spout with a closure cap.
Figure 14B:
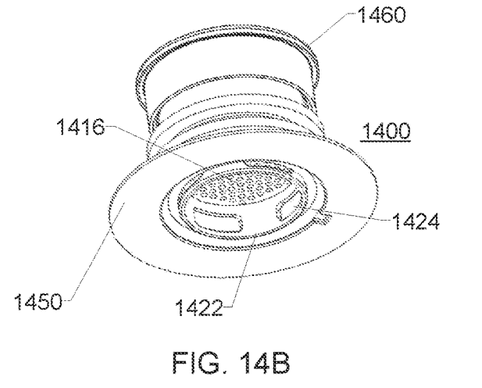
FIG. 14B is a bottom isometric view of the spout shown in FIG. 14A with the removable filter in a partially inserted condition.
Figure 14C:
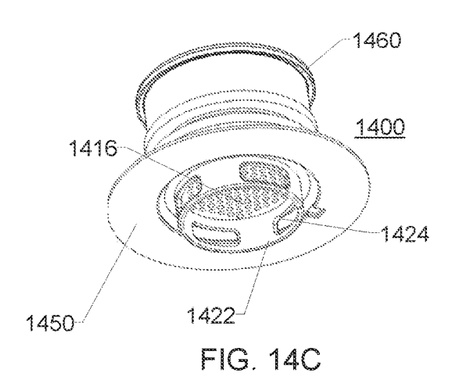
FIG. 14C is a bottom isometric view of the spout shown in FIG. 14A with the removable filter in a closed position.

FIGS. 14A-14C show another embodiment of a removable filter 1414 configured to be inserted within a spout wall 1410. FIG. 14A shows a cross section view of the removable filter 1414 within the spout 1400, along with a closure cap 1460 and a portion of a bag-in-box style film container 1480.

The removable filter 1414 includes a filter portion 1416 and a wall portion 1418. The wall portion 1418 may include a cylindrical upper wall 1420 above the filter portion 1416 and a cylindrical lower wall 1422 below the filter portion 1416. In some embodiments, the upper wall 1420 and lower wall 1422 may have the same outer diameter. In other embodiments, the upper wall 1420 may be wider than the lower wall 1422. In other embodiments, the lower wall 1422 may be wider than the upper wall 1420. Similar to the removable filter 1314 of FIG. 13, the removable filter 1414 may be made of the same material as the spout 1400 or an activated carbon material such as activated charcoal.

The lower wall portion 1418 has an interference fit with the spout wall 1410 allowing the removable filter 1410 to slide in or out of the spout wall 1410 when force is applied axially, but remain stationary within the spout wall when insufficient force is applied. As shown in FIG. 14A, the closure cap 1460 may include an inner wall 1462 and an outer wall 1464. The inner wall 1462 may abut against the upper wall 1420 of the removable filter 1414 thus allowing an assembler to further insert the removable filter 1414 by pushing on the top surface 1466 of the closure cap 1460. FIG. 14B shows the removable filter 1414 and closure cap 1460 only partially inserted within the spout wall 1410. FIGS. 14A and 14C show the removable filter 1414 and closure cap 1460 fully inserted within the spout wall 1410. One would recognize other similar fitments including fitments with an inner wall 1462, such as fitments with valve assemblies or hose connections to dispensing systems, could also be used with a similar spout wall 1410 and removable filter 1414.

The lower wall 1422 may include circulation holes 1424. As shown in FIG. 14A, the lower wall 1422 may extend beyond or below the bag attachment flange 1450 such as in the fully inserted position. This may help separate an upper portion 1482 and lower portion 1484 of the film container 1480 during storage and prior to filling of the film container 1480 with a flowable material. The circulation holes 1424 allow fluid to pass into the spout 1400 while the lower wall 1422 engages the lower portion 1484 of the container 1480. In embodiments with an activated charcoal removable filter 1414, the activated charcoal of the removable filter 1414 may better adsorb any impurities due to the upper portion 1482 and lower portion 1484 being separated. Similarly, in some embodiments, filter media similar to that of FIG. 1 may be inserted into the film container 1480 prior to inserting the removable filter 1414. The extended lower wall 1422 and circulation holes 1424 may similarly facilitate adsorption of contaminants in these embodiments.

Figure 15A:
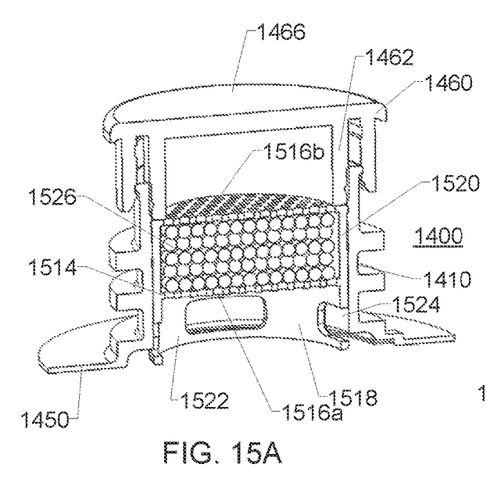
FIG. 15A is a cross-sectional side isometric view of an alternative removable filter with an upper filter portion and a lower filter portion to contain filter media and configured to be pushed into the spout with a closure cap.
Figure 15B:
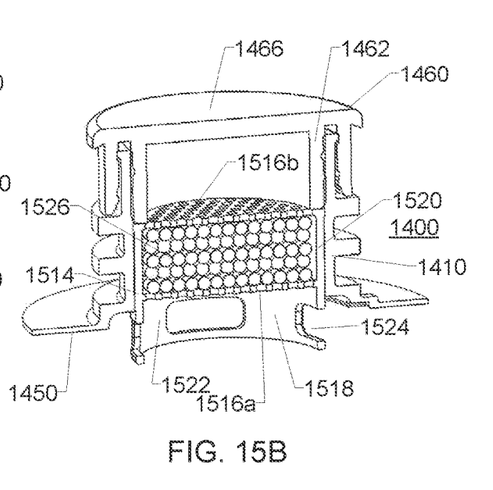
FIG. 15B is a cross-sectional side isometric view of the filter of FIG. 15A in a closed position.

FIGS. 15A and 15B show a cross section view of another embodiment of a removable filter 1514 configured to be inserted within a spout wall 1410. FIG. 15A shows a cross section view of the removable filter 1514 within the spout 1400 and the closure cap 1460 of FIGS. 14A-14C. In FIG. 15A, the removable filter 1514 and closure cap 1460 are partially inserted within the spout 1400. In FIG. 15B, the removable filter 1514 and closure cap 1460 are fully inserted within the spout 1400.

The removable filter 1514 of FIGS. 15A and 15B has a lower filter portion 1516a and an upper filter portion 1516b. The upper wall 1520 connects the upper filter portion 1516b with the lower filter portion 1516a. In other embodiments, the upper wall 1520 may continue to extend above the upper filter portion 1516b. The removable filter 1514 may have filter media 1526 similar to the filter media 116 of FIG. 1 in the space defined by the upper filter portion 1516b, lower filter portion 1516a, and the upper wall 1520. The filter media 1526 may be used to adsorb contaminants or impurities during the storage of the container. In some embodiments, the upper filter portion 1516b may use a strap and removable top similar to the basket strap 524 and basket top 520 shown in FIGS. 5A-5B to allow for the filling of the filter media 1526.

Similar to the removable filter 1414 of FIGS. 14A-14C, the removable filter 1514 may have a lower wall 1522 that may extend beyond or below the bag attachment flange 1450 of the spout 1400. The lower wall 1522 may also include circulation holes 1524 in lower wall portion 1518 that may aid in adsorption of contaminants by the filter media 1526.

The filter media may also help filter the flowable material during both the filling of the container as the flowable material passes through the removable filter 1514 to the container as well as when the flowable material passes through the removable filter 1514 as the fluid is dispensed out of the spout 1400. In some embodiments, the removable filter 1514 may be inserted into the spout 1400 after the fluid has been filled within the container.

The removable filter 1514 may be configured to allow the inner wall 1462 of the removable cap 1460 to help push the removable filter 1514 further into the spout 1400 when the top surface 1466 is pushed toward the spout 1400. In some embodiments, the inner wall 1462 may abut against the upper wall 1520 of the removable filter. In other embodiments, the inner wall 1462 may push against the upper filter 1516b.

Accordingly, the embodiments disclosed herein provide systems and methods for removing and or filtering impurities and contaminants from fluids that are stored and dispensed from packaging.

It will be understood by those skilled in the art that various changes may be made and equivalents may be substituted without departing from the scope of the novel techniques disclosed in this application. In addition, many modifications may be made to adapt a particular situation or material to the teachings of the novel techniques without departing from its scope. Therefore, it is intended that the novel techniques not be limited to the particular techniques disclosed, but that they will include all techniques falling within the scope of the appended claims.

The invention claimed is:

1. A fitment for dispensing a flowable material from a container, the fitment comprising:
   a body configured to be inserted into a spout that is externally mounted to the container and to engage an inner wall of the spout, wherein the body defines a fluid passage that is in fluid communication with an internal region of the container;
   a valve assembly downstream of the fluid passage, wherein the valve assembly includes a valve outlet;
   a flange configured to engage the spout to limit the depth the fitment can be inserted into the spout;
   a first screen in the fluid passage and a second screen downstream of the first screen and upstream of the valve outlet;
   a neck located between the valve assembly and the body and that is located outside of the spout when the body is inserted into the spout, wherein the second screen is located in the neck; and
   a filter media located between the first screen and the second screen, wherein when flowable material is dispensed from the container, the flowable material passes through the first and second screens and the filter media before going through the valve outlet.

2. The fitment of claim 1, wherein the body has a locking mechanism for engaging the inner wall of the spout.

3. The fitment of claim 1, wherein the valve outlet defines a second fluid passage that is generally perpendicular to the fluid passage of the body.

4. The fitment of claim 1, wherein the neck has an inner wall that is coplanar with an inner wall of the body.

5. The fitment of claim 1, wherein the body has an outer wall that is configured to slidingly engage the inner wall of the spout.

6. The fitment of claim 1, wherein the valve assembly includes a valve member that moves with respect to the outlet.

7. The fitment of claim 1, wherein the fluid passage defined by the body includes an inlet opposite a wall portion and wherein the second screen engages the wall portion.

8. The fitment of claim 7, further including a neck positioned between the body and the valve assembly, the neck being in fluid communication with the fluid passage via a port below the wall portion.

9. A fitment for dispensing a flowable material from a container, the fitment comprising:
- a body configured to be inserted into a spout that is externally mounted to the container, wherein the body defines a first fluid passage that is in fluid communication with an internal region of the container;
- a valve assembly downstream of the first fluid passage, wherein the valve assembly includes a valve outlet that defines a second fluid passage that is generally perpendicular to the first fluid passage;
- a flange configured to engage the spout to limit the depth the fitment can be inserted into the spout;
- a first screen in the first fluid passage and a second screen downstream of the first screen and upstream of the valve outlet; and
- a filter media located between the first screen and the second screen, wherein when flowable material is dispensed from the container, the flowable material passes through the first and second screens and the filter media before going through the valve outlet.

10. The fitment of claim 9, wherein the body has a locking mechanism for engaging the inner wall of the spout.

11. The fitment of claim 9, wherein the body has an outer wall that is configured to slidingly engage the inner wall of the spout.

12. The fitment of claim 9, wherein the valve assembly includes a valve member that moves with respect to the outlet.

13. The fitment of claim 9, wherein the first fluid passage includes an inlet opposite a wall portion and wherein the second screen engages the wall portion.

14. The fitment of claim 13, further including a neck positioned between the body and the valve assembly, the neck being in fluid communication with the first fluid passage via a port below the wall portion.

15. The fitment of claim 9, further including a neck located between the valve assembly and the body and that is located outside of the spout when the body is inserted into the spout.

16. The fitment of claim 15, wherein the second screen is located in the neck.

17. The fitment of claim 15 wherein the neck has an inner wall that is coplanar with an inner wall of the body.

18. A fitment for dispensing a flowable material from a container, the fitment comprising:
- a body configured to be inserted into a spout that is externally mounted to the container and to engage an inner wall of the spout, wherein the body defines a fluid passage that is in fluid communication with an internal region of the container;
- a valve assembly downstream of the fluid passage, wherein the valve assembly includes a valve outlet;
- a flange configured to engage the spout to limit the depth the fitment can be inserted into the spout;
- a first screen in the fluid passage and a second screen downstream of the first screen and upstream of the valve outlet;
- a neck located between the valve assembly and the body and that is located outside of the spout when the body is inserted into the spout, wherein the neck has an inner wall that is coplanar with an inner wall of the body; and
- a filter media located between the first screen and the second screen, wherein when flowable material is dispensed from the container, the flowable material passes through the first and second screens and the filter media before going through the valve outlet.

19. The fitment of claim 18, wherein the body has a locking mechanism for engaging the inner wall of the spout.

20. The fitment of claim 18, wherein the valve outlet defines a second fluid passage that is generally perpendicular to the fluid passage of the body.

* * * * *